US006248012B1

United States Patent
Folkmann (10) Patent No.: US 6,248,012 B1
(45) Date of Patent: Jun. 19, 2001

(54) METHOD, AN APPARATUS AND A KNIFE FOR MECHANICAL RELEASING OF RIBS IN A PART CARCASS

(75) Inventor: Peter Folkmann, Borup (DK)

(73) Assignee: Slagteriernes Forskningsinstitut, Roskilde (DK)

(*) Notice: Subject to any disclaimer, the term of this patent is extended or adjusted under 35 U.S.C. 154(b) by 0 days.

(21) Appl. No.: 09/462,898

(22) PCT Filed: May 17, 1999

(86) PCT No.: PCT/DK99/00269

§ 371 Date: Jan. 18, 2000

§ 102(e) Date: Jan. 18, 2000

(87) PCT Pub. No.: WO99/59417

PCT Pub. Date: Nov. 25, 1999

(30) Foreign Application Priority Data

May 18, 1998 (DK) .................................... 0673/98

(51) Int. Cl.⁷ .................................................. A22C 17/04
(52) U.S. Cl. ............................................ 452/135; 452/171
(58) Field of Search .................................. 452/135, 136, 452/171

(56) References Cited

U.S. PATENT DOCUMENTS

| 3,581,336 | | 6/1971 | Herubel . | |
|---|---|---|---|---|
| 3,811,152 | * | 5/1974 | Herubel | 452/136 |
| 5,211,600 | * | 5/1993 | Passchier | 452/135 |
| 5,368,520 | * | 11/1994 | Koch et al. | 452/136 |
| 5,525,103 | * | 6/1996 | White et al. | 452/135 |
| 5,533,928 | * | 7/1996 | Karubian et al. | 452/135 |
| 5,542,878 | * | 8/1996 | Sheedy et al. | 452/135 |
| 5,813,905 | * | 9/1998 | Boeijen et al. | 452/135 |
| 6,126,535 | * | 10/2000 | Post | 452/171 |

FOREIGN PATENT DOCUMENTS

| 172327 | 3/1998 | (DK) . |
|---|---|---|
| 0502581 A1 | 9/1992 | (EP) . |
| 0832563 A1 | 4/1998 | (EP) . |
| WO 97/17853 | 5/1997 | (WO) . |
| WO 99/08538 | 2/1999 | (WO) . |

* cited by examiner

*Primary Examiner*—Willis Little
(74) *Attorney, Agent, or Firm*—Sughrue, Mion, Zinn, Macpeak & Seas, PLLC

(57) ABSTRACT

The apparatus comprises a knife (21) with a substantially rectilinear cutting edge (27) and mounted in a knife holder (23, 24), a device with a holder for suspending the part carcass by the spine, and means (1, 4, 5) for establishing a relative movement between the part carcass (2) and the knife (21) in a direction in parallel with the spine (9), the knife holder (23, 24) being adapted to displace the knife (21) in a plane perpendicular to the direction of the spine and preferably to turn the knife about an axis in parallel with the cutting edge (27).

16 Claims, 6 Drawing Sheets

METHOD, AN APPARATUS AND A KNIFE FOR MECHANICAL RELEASING OF RIBS IN A PART CARCASS

The present invention relates to a method for mechanical releasing of the ribs and the meat positioned therebetween from the adjacent meat in a part carcass with spine and split along the central longitudinal plane.

The invention thus relates in particular, but not exclusively, to releasing of the riblet, i.e. the ribs with the adherent meat and possible sternum, in a fore-end of a splitted carcass, in particular pig carcass, divided in two or three, but may also be used in connection with a middle or a loin.

DK-B-172 327 (Slagteriernes Forskningsinstitut) discloses a method for deboning a fore-end of a pig carcass. It is said that the riblet may be cut from the fore-end by means of a knife (not shown or described in detail) which is mounted on a tool which is moreover used for freeing the neck bone. The knife is to be moved along and guided by the underside of the ribs, and the movement has to be oblique relative to the longitudinal direction of the neck bone and is to take place in a direction away from the neck joint and the neck bone. It is further said that the cut has to be made in a direction away from the neck joint towards the distal end of the neck bone, i.e. from in front.

EP-A-0 502 581 discloses a method for mechanial releasing of ribs in a part carcass, in which the spine is cut free first by means of a circular saw, whereafter the ribs are cut free one by one by means of a special loop-like knife which is passed along each single rib, the meat positioned between the ribs being left connected with the part carcass.

WO-A-99/08538 (Slagteriernes Forskningsinstitut) discloses an apparatus for mechanical removal of the spine from a part of a carcass, in particular a fore-end of a splitted pig carcass. The apparatus comprises a conveyor with a band supporting and advancing the fore-end, and a guide rail towards which the spine of the fore-end is pressed such that the spine is kept substantially rectilinearly extended. The spine is cut free from the fore-end by means of knives which are positioned stationarily along the guide rail.

The object of the invention is to provide a method, an apparatus and a knife for mechanical releasing of the ribs and the meat positioned therebetween from the adjacent meat of a part carcass of a splitted carcass with spine, said method, apparatus and knife being tolerant towards the varying anatomic conditions of the part carcasses, such that the release may take place without the part carcasses having to be measured and such that the release may be equally satisfactorily performed irrespective of whether it is a question of a big or a small part carcass. The method is preferably to be used in connection with said apparatus.

This object is met according to the invention by means of a method which is characteristic in that the part of the spine carrying the ribs is brought into engagement with a holder, that the thus secured part carcass and a knife with a substantially rectilinear cutting edge ending in a point is moved towards each other so that the point of the knife is inserted from behind at the exterior side of the rib head of the rearmost rib and the cutting edge is brought to abut on a rib surface, and that the secured part carcass and the knife is moved further towards each other in the direction of the spine while the knife is kept, seen along the cutting edge in the direction of the point, in a predetermined angular position obliquely inwards and upwards relative to the carcass, its central plane and a second plane which is perpendicular to the central plane and in parallel with the spine and the knife is moved along the ribs away from the spine.

It has surprisingly turned out that this method makes it possible to use a knife with a rectilinear cutting edge which by a suitable choice of angular position will follow all the ribs in the part carcass rather closely such that a comparatively simple, but effective method is obtained for mechanical releasing of ribs, which method is independent of anatomic differences from carcass to carcass and the variations in the position of division at the cutting.

The method has proved particularly suitable for removal of riblets, as it utilizes the fact that there is no big variation from carcass to carcass at the spine, whereas there may be a big variation in respect of the positioning of the sternum. The method is not very sensitive to said variation.

When introduced from behind, the knife may be positioned between the stationary knives in said apparatus, ahead of a knife or a saw cutting off the ribs. By thus using said apparatus, it becomes possible to establish the positioning of the rib head of the rearmost rib and thus the insertion position sufficiently well so that the cutting may be started without any detailed knowledge of the size etc. of the part carcass.

Preferably the point of the knife is at least during the first phase of the releasing moved substantially rectilinearly forwards relative to the part carcass.

The position of the foremost rib in the part carcass relative to the knife is preferably detected, and the movement of the knife along the ribs away from the spine and the possible rotation of the knife around an axis parallel with the edge, depending on the movement of the knife and the part carcass towards one another in the direction of the spine, is controlled on basis of said detection.

If the part carcass comprises a sternum, which is the case with a fore-end, the method preferably comprises the steps that the knife, when the knife has been advanced a distance along the ribs away from the spine, is rotated about an axis which is substantially parallel to the cutting edge into a smaller angle of attack with the the ribs, that the knife during continued movement towards the part carcass in the direction of the spine is moved further away from the spine obliquely towards the central plane of the carcass, and that the breast side, when the knife has thus been advanced yet another predetermined distance is pressed downwards and towards the carcass, following which the knife under a continuous movement relative to the part carcass in the direction of the spine is taken sideways out from the part carcass. In this manner the knife may advance along and be guided by the ribs, until it is supposed to meet the gristle positioned in continuation of the ribs in case of a relatively small animal, whereafter the breast side is lifted by rotating the knife into a smaller angle of attack to prevent the knife from cutting into the gristle and then later into the sternum. When the knife is advanced so far that it is expected to reached a position below the sternum at the foremost rib, even in case of a relatively big animal, the breast side is pressed downwards and towards the carcass to ensure that the further incision is made so close to the sternum as possible.

The angle of the cutting edge relative to the centre plane is 15°–30°, preferably 20°–26°, and further preferably approx. 23° at least at the insertion of the knife and when the knife passes a possible sternum, and that the angle relative to the second plane is 5°–20°, preferably 7°–17° and further preferably approx. 11° at least at the insertion of the knife. Within these limits it is possible depending on the actual race of the slaughtered animals, to find angles, at which it is possible to hold the cutting edge in a constant angle relative to the centre plane and the second plane. This entails that a relative simple apparatus may be used for holding and guiding the knife.

The knife is preferably pressed sideways towards the ribs while moved along them and is held in a cutting angle adjusted such that the flank of the knife abuts the ribs. Hereby is obtained that the rib, which protrudes relative to a cylinder or conus surface which the cutting edge describes during its movement, is pressed into such a surface in such a manner that the cutting edge slides across all the ribs and frees as much as possible of the adjacent meat. The rearmost rib in a part carcass has normally a substantially bigger curvature than the foremost rib. By using said obliquely extending blade problems in respect of differing cutting angles at the foremost and the rearmost ribs are avoided, the knife not starting to cut at the foremost rib until it has made an incision along a substantial curved portion at the rearmost rib and thus has reached a portion extending substantially in the same way as the first part of the foremost rib. The flank thus substantially abuts on all the ribs, which gives a tight and correct cut along the surfaces of the bones. During the cutting the knife turns all the time, its flank abutting optimally on the bone surfaces.

At the beginning the knife is preferably inserted at a predetermined point relative to the holder and next to the rearmost rib at a distance therefrom, and is due to the insertion brought into abutment on this rib. Hereby a higher tolerance in respect of the insertion of the knife is obtained.

The knife is preferably rotated about an axis containing the cutting edge. In this manner the knife angle relative to the ribs is adjusted without influencing the arrangements pressing the knife towards the bone surfaces.

The object is further met by means of an apparatus for use in mechanical releasing of the ribs and the meat positioned therebetween from the adjacent meat of a part carcass of a splitted carcass with a spine, which apparatus is characteristic in comprising a knife having a substantially rectilinear cutting edge ending in a point and being mounted in a knife holder, a device with a holder which can be brought into engagement with the part of the spine of the part carcass carrying the ribs, and means for establishing a relative movement between the part carcass and the knife towards each other in the direction of the spine and further to move the knife away from the spine.

The knife holder is preferably adapted to hold the knife with the cutting edge, viewed along the cutting edge in the direction of the point, at a predetermined angle which, when the spine of a part carcass is in engagement with the holder, is obliquely inwards and upwards relative to the carcass, its central plane and a second plane which is perpendicular to the central plane and parallel with the spine.

The knife holder is preferably adapted to displace the knife in a plane substantially perpendicular to the direction of the spine and preferably to rotate the knife about an axis which is parallel to the cutting edge.

The apparatus preferably comprises a detecting device for detecting the passage of the foremost rib of a part carcass by a relative movement between a secured part carcass and the knife towards one another in the direction of the spine, and guiding means for guiding the displacement of the knife away from the spine and the possible rotation around an axis parallel with the edge, depending on the movement of the knife and the part carcass towards one another in the direction of the spine on basis of the detection. In this way, a correct guiding of the movement of the knife is obtained irrespective of whether the part carcass has become somewhat longer or shorter during the cutting of the carcass.

Moreover, shackles are preferably provided for guiding the breast side of the part carcass. In this way, a correct cut is secured in the area around the sternum.

The object is further met by an asymmetric knife for use for mechanical cutting free of the ribs and the meat positioned therebetween from the adjacent meat in a part carcass of a splitted carcass with spine, which knife is characteristic by an elongate, rigid blade with a substantially rectilinear cutting edge ending in a point, a bias cutoff of the blade extending from the point, two substantially parallel side surfaces and a flank angled relative to the adjacent side surface, said flank extending from the cutting edge to a line positioned approx. 4–25 mm, preferably approx. 5–20 mm, further preferably approx. 7–15 mm and for instance approx. 10 mm from the cutting edge, the angle ($\alpha$) between the flank and the adjacent side surface being smaller than 180°, preferably smaller than 175° and for instance approx. 170°.

Ribs are curved, but are not identical from animal to animal even within the same race. The knife according to the invention is suited for sliding over the ribs and thereby be guided in a predetermined path, as the knife on account of the relatively narrow flank is little sensitive in respect of its guiding along the ribs relative to its precise angular position in relation to the surface of the ribs, a given rotation of the knife blade around an axis parallel with the cutting edge only meaning little to the distance of the cutting edge from the surface of the ribs. At the same time the width of the flank is sufficient for ensuring that the knife blade may slide across a possible hollow in a rib without the cutting edge penetrating into the hollow and into the bone. On account of the angle between the flank and the adjacent side surface it is possible, without influencing the dimensions of the flank, to design the knife blade with sufficient thickness and width to ensure the required rigidity which is a prerequisite for pressing the rib into a cylinder or conus surface.

The flank may be plane or convex to correspond to the curvature of the ribs or it may be slightly concave.

The point of the knife is bent out of the plane of the blade opposite the side of the flank and in that preferably a bevelling is provided between the flank and the cutting edge. This prevents the point from hitting a rib which might be positioned particularly far outside the cylinder or conus surface described by the cutting edge, and by means of the bevelling, increased safety is obtained against the knife hitting a rib if the predetermined angle of the knife is a little too steep relative to a certain animal or in case of protrusions on a rib.

In the present description is said that the knife is inserted into the meat or that knife and part carcass is moved towards each other. By this should be understood that the meat may be moved relative to a knife stationary in the direction of the spine, that the knife is moved into the meat in the direction of the spine, or that both meat and knife may be moved (but move mutually) in the direction of the spine. When said in the present description that the meat is moved towards a knife, this should also include the embodiment in which the meat is stationary and the knife is guided in the meat.

The invention will be described in detail in the following by means of an example of an embodiment with reference to the schematic drawing, in which FIG. 1 shows an apparatus for removal of the spine from a fore-end, in which apparatus the invention is incorporated, FIG. 1*a* a guide mechanism, FIG. 2 a view from the side of a knife according to the invention, FIG. 3 a sectional view along the line III—III in FIG. 2, FIG. 4 the knife in FIG. 2 seen in the direction of the arrow IV, FIG. 5 the rearmost rib during a first phase of the releasing of the ribs, FIG. 6 a view corresponding to FIG. 5 during a later step of the releasing of the ribs, FIG. 7 a view corresponding to FIG. 5 during the final step of the releasing of the ribs, and FIG. 8 curves schematically illustrating the movement of the knife.

Figure 1:
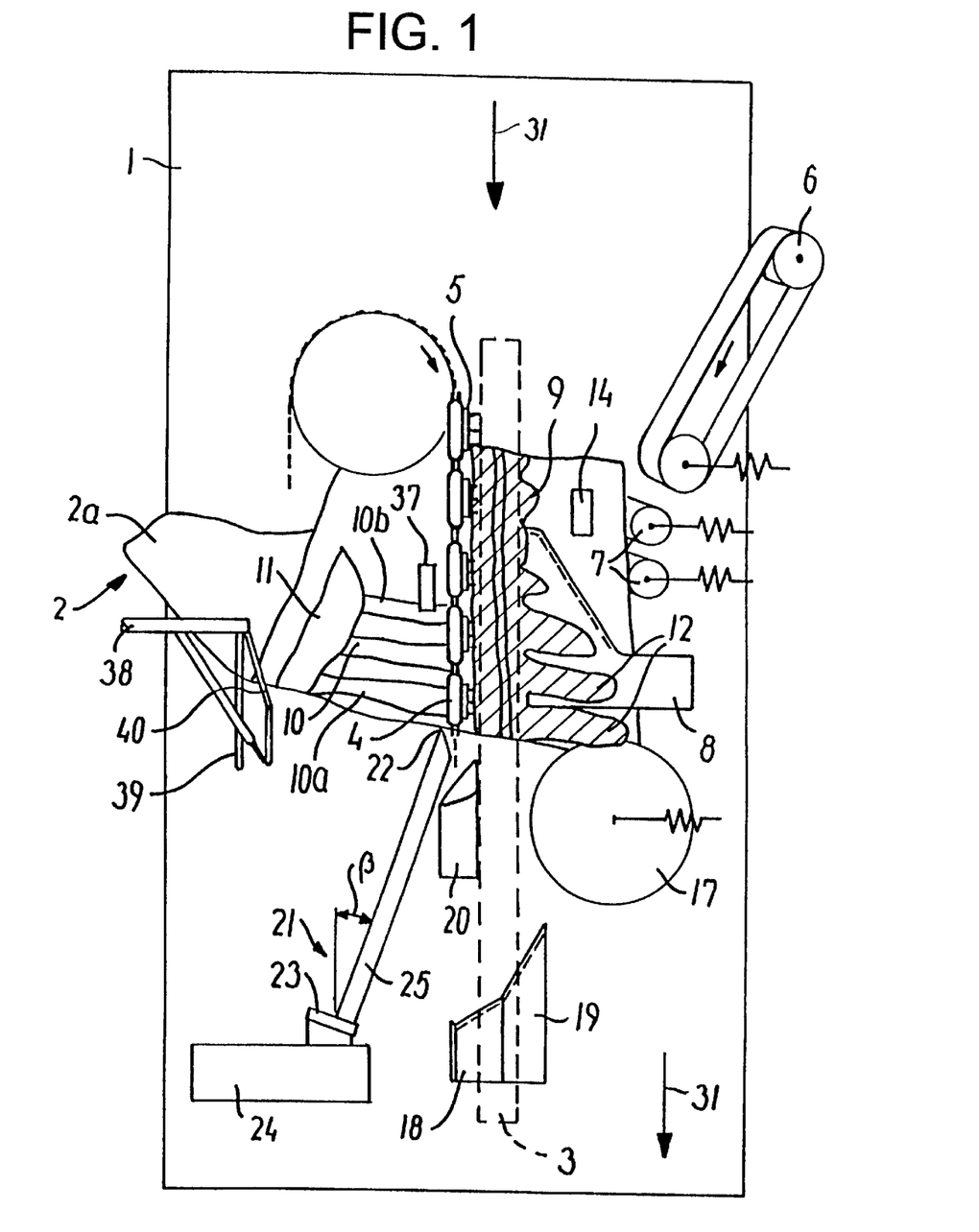

The apparatus shown in FIG. 1 for removal of the spine from a fore-end 2 with a shank 2a comprises a conveyor belt 1 with a conveying direction (arrows 31), the purpose of which is to support and advance the fore-end 2. In FIG. 1 the spine 9 of the fore-end is hatched.

Above the conveyor belt 1 a guide rail 3 extends, said rail serving as fixed abutment for the spine 9 of the fore-end 2. The conveyor belt 1 is spring suspended and presses the fore-end 2 up against the guide rail 3. Substantially perpendicular to the abutment surface of the guide rail 3 a side guide is provided in the form of a driven continuous chain 4 with contact plates 5 provided with spikes. A vertical band conveyor guides 6 the fore-end 2 towards this chain 4 and presses the vertebras of the spine 9 into the spikes on the contact plates 5. The band conveyor 6 is spring-suspended in order to be adjustable to the fore-end 2. In the far end the band conveyor 6 passes into pressure rollers 7 which are also spring-suspended. The apparatus in FIG. 1 has a first knife tool 8 for separating the meat of the fore-end 2 from spinous processes 12 and the dorsal side of the spine 9. In front of the tool 8 a presser shoe arrangement with a contact plate 14 is provided, said arrangement serving during the cutting of the tool 18 in particular for pressing down the meat opposite the first cervical vertebrae.

Figure 5:
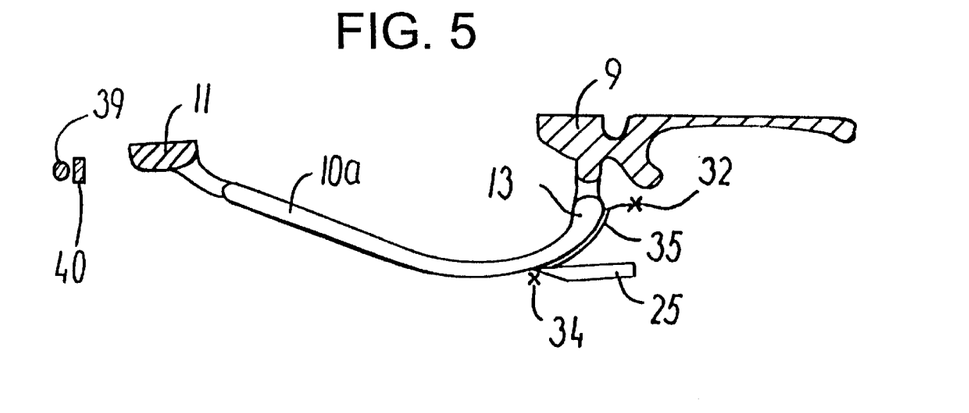

Immediately behind the knife tool 8 a resiliently mounted guide disc 17 is provided which assumes a position in the track left by the cutting tool 8. The guide disc 7 supports the spinous processes 12 and presses the spine 9 firmly against the contact plates 5 of the chain 4 and the guide rail 3. Behind the guide disc 17 a second cutting tool 18 with a knife blade 19 is provided. The second cutting tool 18 is adapted to cut the ribs 10a, 10b at the rib heads 13 and to separate the meat from the lateral side of the spine 9 (see FIG. 5). The part of the cutting tool 18 cutting the ribs is preferably a circular saw (not shown) which is placed upstream of the knife blade 19.

In addition to the guide disc 17 a third tool 20 is provided which has two knives perpendicular to each other and which serves to cut the neck bone strip free from the underside and the transverse processes of the cervical vertebrae without cutting the strip's connection with the neck fillet.

The chain 4 with the contact plates 5 and the guide rail 3 cooperate with the guide disc 17 as a holder for the spine 9.

For further details in the apparatus shown in FIG. 1 and described until now, reference is made to WO-A-99/08538.

Figure 1A:
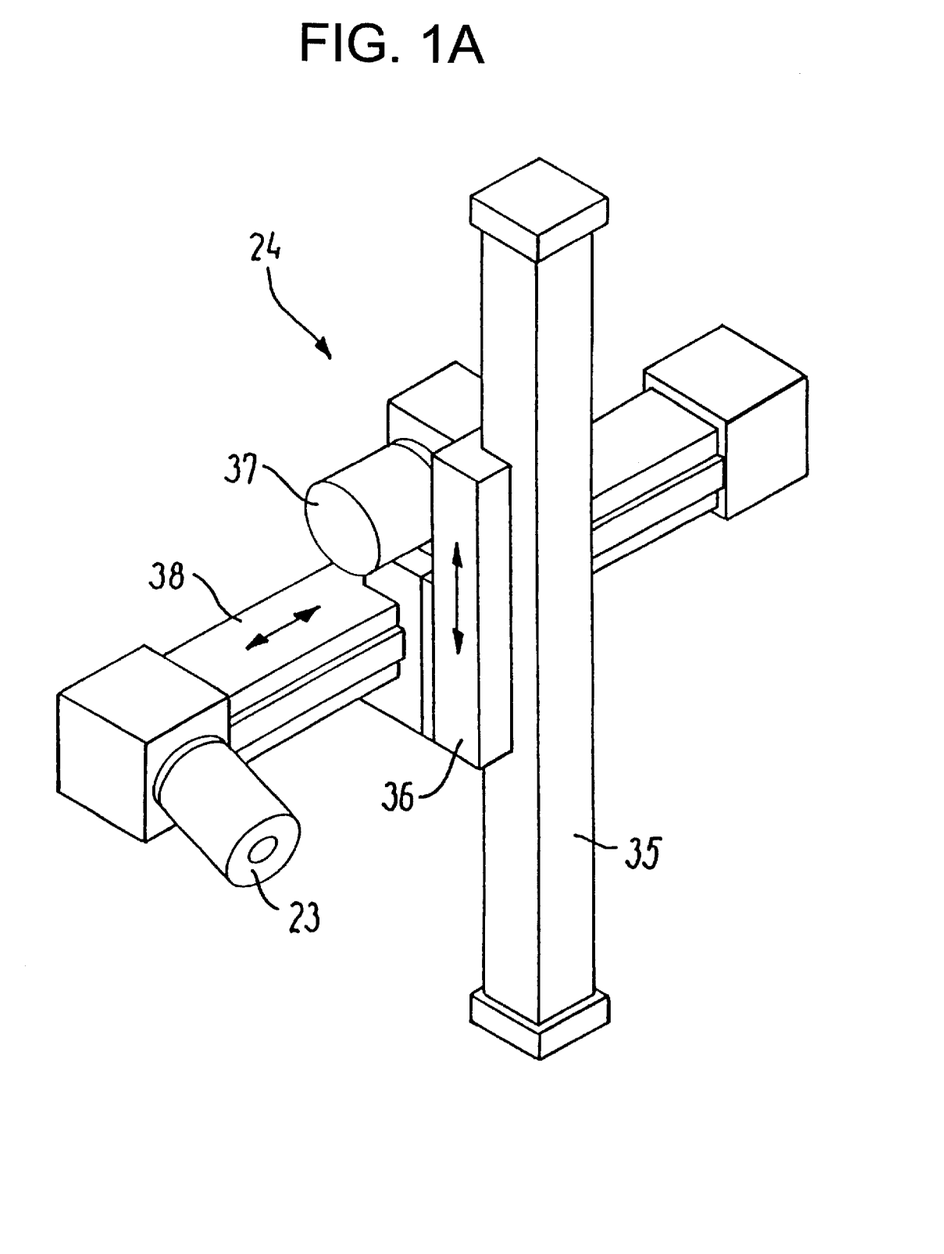

Moreover, the apparatus shown in FIG. 1 is provided with a knife 21 according to the present invention. The knife 21 has a point 22 and is at the end, which is opposite relative to the point, mounted on a turning plate 23 which in turn is mounted on a transport mechanism 24 of the kind shown in FIG. 1a. The mecanhism 24 moves the knife in a plane which is substantially perpendicular to the longitudinal direction of the spine and presses it during the first phase of the cutting towards the ribs with such a force that they yield partially in the rib heads. The transport mechanism 24 comprises a column 35, which on a sledge 36 can be moved vertically, as shown by a double arrow, by means of a motor 37. A cross beam 38 is mounted on the sledge 36 and can be moved in horizontal direction as shown by another double arrow, such that the turning plate 23 which is mounted at the end of the cross beam 38 can be moved vertically and horizontally in a plane by means of the guiding mechanism 24. It should be noted that the turning plate 23 is mounted obliquely relative to this plane. The knife 21 can by the turning of the turning plate 23 be turned about its cutting edge, and the knife 21 and the turning plate 23 can by means of the guiding mechanism 24 be moved in a plane perpendicular to the guide rail 3. In the embodiment shown the knife 21 is held with its longitudinal axis in a predetermined direction. The knife blade 25 is thus preferably held such that an angle β of 5°–20°, preferably 7°–17°, and in the example approx. 11° relative to the transport direction, seen in the plane of the conveyor belt 1, and an angle of 15°–30°, preferably 20°–26°, and in the example approx. 23° in relation to the direction of transport as viewed in a plane perpendicular to the plane of the conveyor belt 1, the knife blade 25 from the turning plate 23 extending obliquely up towards the viewer in FIG. 1.

Figure 2:
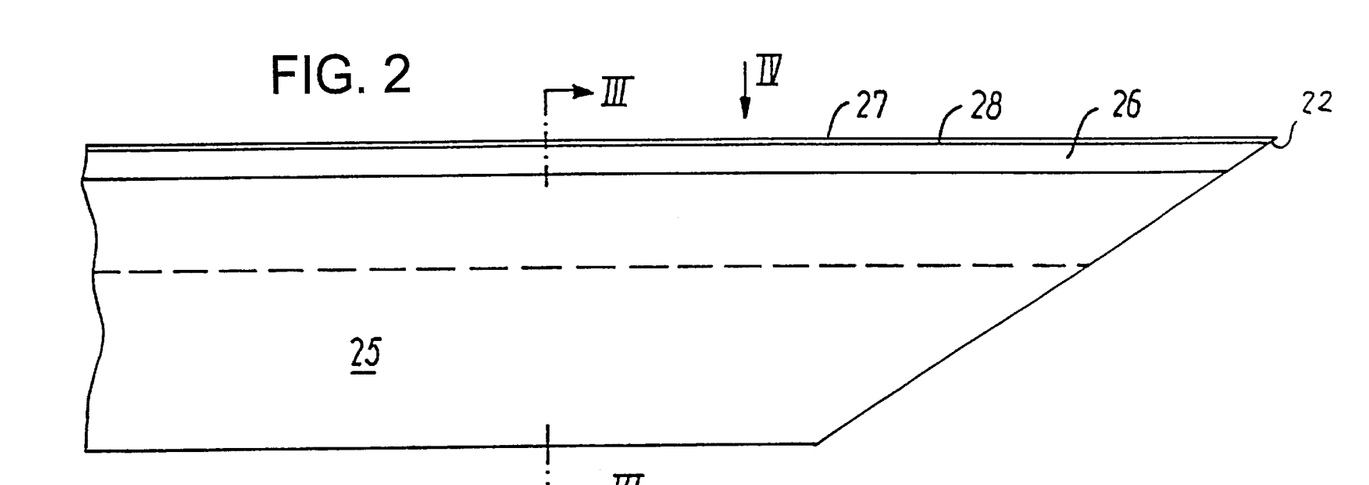
Figure 3:
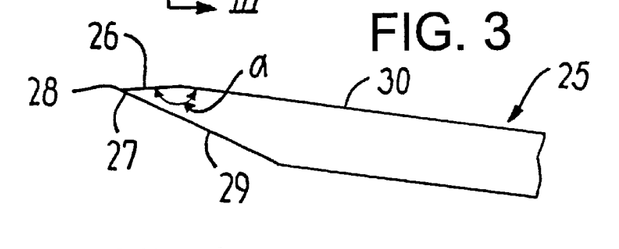
Figure 4:
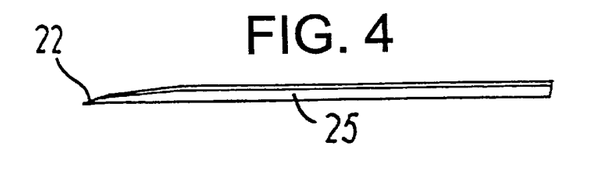

The blade 25 of the knife 21 is shown in detail in FIGS. 2–4 and has a comparatively big thickness, for instance approx. 6 mm. The knife blade 25 has in the example a plane flank 26 which has a sufficient width to ensure a good, sliding abutment on the ribs. The width of the flank is approx. 4–25 mm, preferably approx. 65–20 mm, further preferably approx. 7–15 mm and for example approx. 10 mm. Between the flank 26 and the cutting edge 27 of the knife 27 a small bevelling 28 is provided which, as will be explained in detail in the following, is to prevent the cutting edge from cutting the ribs. There is between the flank 26 and the adjacent side surface 30 an angle a of approx. 170°. The knife blade 25 has a comparatively wide face 29 on account of the asymmetry of the knife blade 25. As will be seen from FIG. 4 the end of the knife blade 25 is bent slightly downwards at the point 22.

Above the conveyor belt 1, a detecting device 37 is provided for detecting the surface of the fore-end 2 and in particular for detecting and giving a signal when the foremost rib 10b passes. Furthermore, an arm 38 is provided which carries a first shackle 39 extending in curve downwards towards and along with the conveyor belt 1, and a second shackle 40 extending in a curve towards and along the spine of a passing fore-end to guide said fore-end. The functioning of the shackles 39, 40 will be explained in detail in below.

By means of the equipment described hitherto, the method according to the invention may be carried out as follows.

The fore-end 2 is by means of the conveyors 1 and 6 brought into engagement such that it is retained at its spine 9 by the chain 4 with contact plates 5 and the guide rail 3. It is thus fixed or secured in a plane perpendicular to its longitudinal axis, but can be moved forcedly in its longitudinal direction. The knife 8 cuts along the spinous processes 12 and the spine, when the spine by force is advanced towards the knife 8. The succeeding knife 21 is held with its blade 25 in a predetermined position, and when the fore-end 2 is advanced towards it as shown by arrows 31 the point 22 of the knife will penetrate into the fore-end 2 at the point 32 (FIG. 5) next to the rib head 13 of the rearmost rib 10a. The advancing of the fore-end 2 continues so that the knife gets in contact with the rib 10a on account of the oblique position of the blade and starts cutting along the rib 10a.

During the movement of the fore-end 2, it slides under the detecting device 37 which detects the passage of the foremost rib 10b and gives a signal to the control device which controls the guiding mechanism 24 and the turning plate 23 for the knife 21 depending on the position measured and the travelling speed of the fore-end in the direction of the spine.

Figure 8:
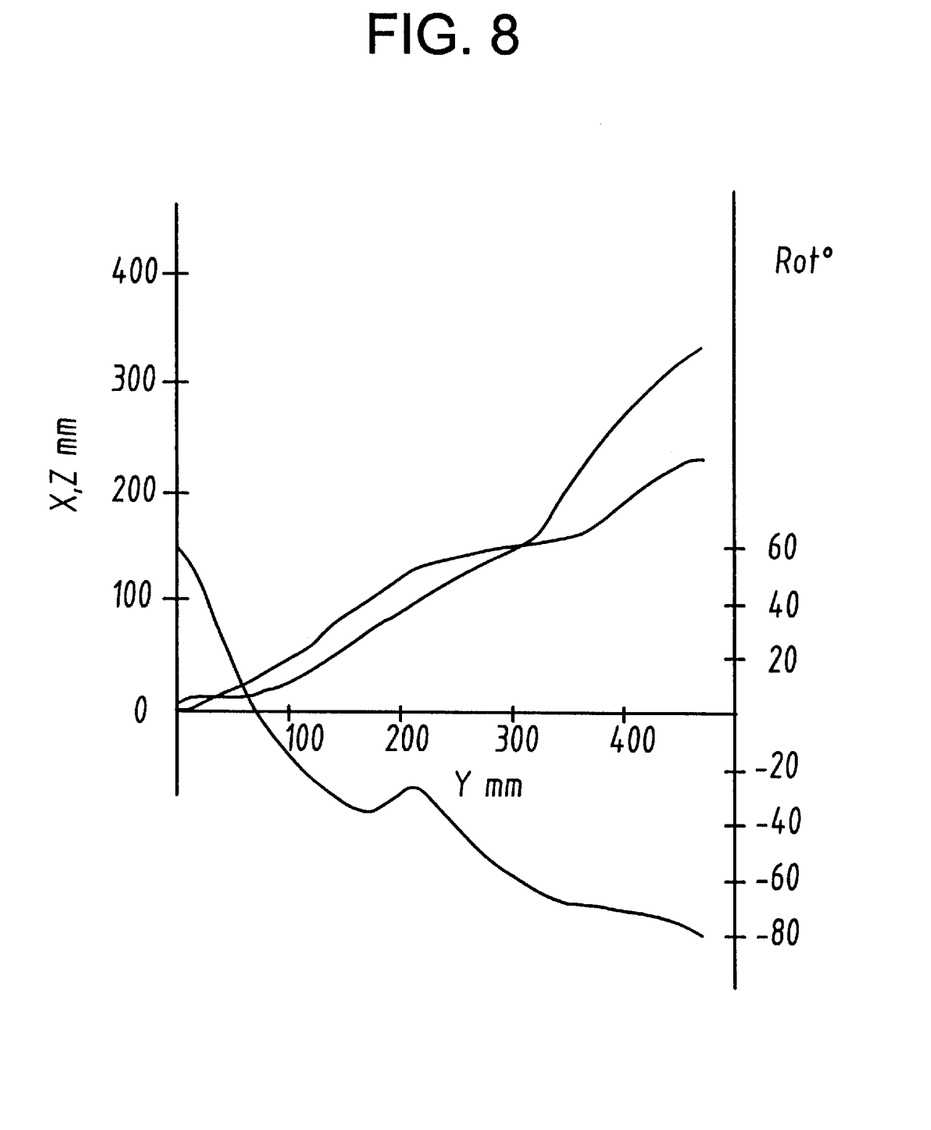

The movement of the knife is shown schematically by the curves in FIG. 8 which show the positioning of the knife point 22 in a given cross-plane, y being the transport direction 31 of the fore-end 2 and z being vertically upwards positively towards the viewer, whereas x is perpendicular to y and z and positive towards the left of the FIGS. 1 and 5–7. Rot indicates the rotation angle of the knife blade 25, 0 is facing the conveyor belt 1 broadsidedly and the cutting-edge is to the left of FIGS. 1 and 5–7, and positive values indicate that the blade is turned towards an edge position in which the cutting-edge is closer to the conveyor belt 1.

On account of the predetermined angular position of the knife blade 25 and the rotation of the turning plate 23 and the movement of the knife 21 towards the left, the attacking point of the cutting edge 27 opposite the rearmost rib 10a during the relative movement between the fore-end 2 and the knife 21 moves from the point 32 to the point 34 via a path 35 substantially as shown. The blade performs a turning during the cutting at the ribs. The point 22 being bent slightly downwards and the introduction taking place in a fixed safe distance from the rib head 13, it is with great certainty avoided that it hits a rib during this initial step.

The flank 26 is in abutment on the ribs, and the knife blade 25 will not cut into the ribs 10a, 10b. As the knife is rigid and the ribs resilient at their rib heads and as the knife is guided sideways and vertically in accordance with the guiding curve which establishes a pressure between knife and fore-end, the ribs will be forced to follow the line defined by the knife, such that a cut close to the ribs is performed irrespective of anatomic differences between the part carcasses. The oblique position in question also contributes to this.

Figure 6:
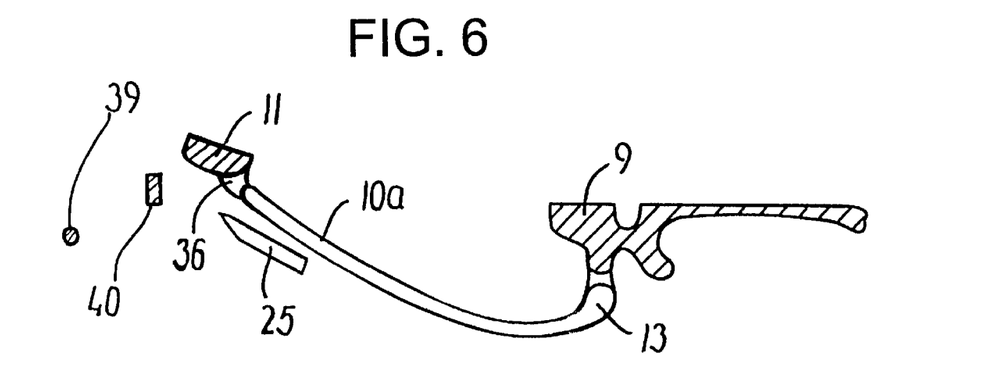
Figure 7:
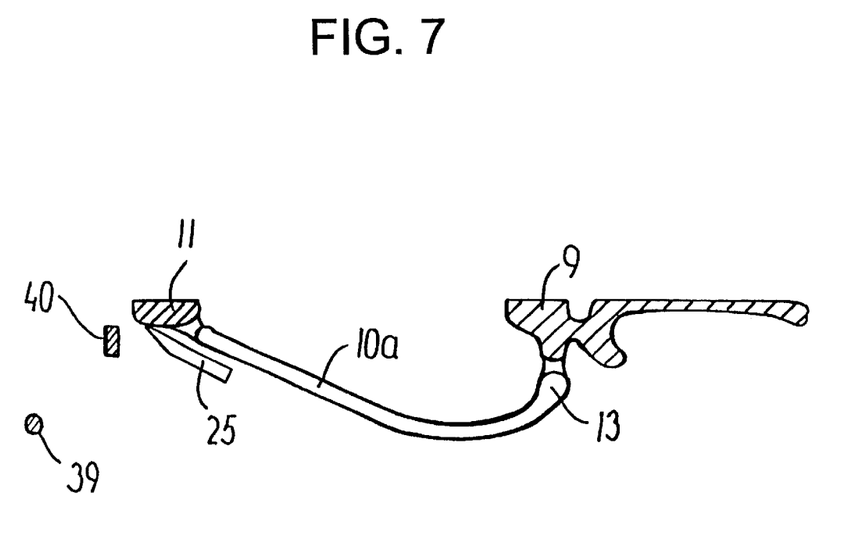

Simultaneously with the continuous advancing of the fore-end, the lateral and vertical movement and the rotation of the knife 21 on the turning plate 23 is continued such that the blade 25 in abutment on the ribs follows a curve forwards to a predetermined position slightly behind the position shown in FIG. 6, and in which the cutting edge 27 is expected not yet to have arrived to the gristle connections 36 between the ribs and the sternum. At this time the angle of attack of the blade is small so that the part of the fore-end 2 comprising the sternum 11 is rather lifted by the side of the blade 25 as shown in FIG. 6, and the knife blade 25 is kept rotated so that the flank extends substantially in parallel to the ribs until the predetermined positions shown in FIG. 7, in which the cutting edge 27 is expected to be below the sternum 11. At this time the part of the fore-end 2 comprising the sternum is lowered again, the shank 2a passing under the first shackle 39 which presses it down, and simultaneously the second shackle 40 gets into abutment on the skin of the fore-end 32 close to the sternum 11 such that this part of the fore-end is brought to assume a more well-defined position relative to the movement and rotation of the knife. At the sternum 11, the knife is turned more and more upwards such that the knife during the further movement of the fore-end 2 cuts closely to the sternum which is thereby cut free of the fore-end 2. The second shackle 40 thus has the function of keeping the sternum 11 in a predetermined position, which contributes to making the knife blade 25 cut at the desired point in the fore-end 2 at the sternum. Without the second shackle 40, the position of the sternum would be indistinct, parly because the size of the various fore-ends is difffering, partly because the sternum on account of the resiliency of the meat may move. The riblet is now cut free.

When the fore-end subsequently passes the second cutting tool 18, the riblet is separated completely from the fore-end 2, the circular saw of the cutting tool cutting through the rib heads connecting the ribs with the spine.

What is claimed is:

1. A method for mechanical releasing of the ribs and the meat positioned therebetween from the adjacent meat in a part carcass of a splitted carcass with spine, characterized in that the part of the spine (9) carrying the ribs is brought into engagement with a holder (3, 4, 5, 17), that the thus secured part carcass and a knife (21) with a substantially rectilinear cutting edge (27) ending in a point (22) is moved towards each other so that the point (22) of the knife (21) is inserted from behind at the exterior side of the rib head (13) of the rearmost rib (10a) and the cutting edge (27) is brought to abut on a rib surface, and that the secured part carcass (2) and the knife (21) is moved further towards each other in the direction of the spine while the knife (21) is kept, seen along the cutting edge in the direction of the point (22), in a predetermined angular position obliquely inwards and upwards relative to the carcass (2), its central plane and a second plane which is perpendicular to the central plane and in parallel with the spine (9) and the knife is moved along the ribs away from the spine.

2. A method according to claim 1, characterized in that the point (22) of the knife at least during the first phase of the releasing is moved substantially rectilinearly forwards relative to the part carcass (2).

3. A method according to claim 1, characterized in that the position of the foremost rib (10b) in the part carcass (2) relative to the knife (21) is detected, and that the movement of the knife (21) along the ribs away from the spine and the possible rotation of the knife around an axis parallel with the edge (22), depending on the movement of the knife (21) and the part carcass (2) towards each other in the direction of the spine, is controlled on basis of said detection.

4. A method according to claim 1, in which the part carcass (2) comprises a sternum (11), characterized in that the knife, when the knife (21) has been advanced a distance along the ribs (10a, 10b) away from the spine (9), is rotated about an axis which is substantially parallel to the cutting edge (27) into a smaller angle of attack with the the ribs (10a, 10b), that the knife (21) during continued movement towards the part carcass (2) in the direction of the spine is moved further away from the spine (9) obliquely towards the central plane of the carcass, and that the breast side, when the knife (21) has thus been advanced yet another predetermined distance is pressed downwards and towards the carcass, following which the knife (21) under a continuous movement relative to the part carcass (2) in the direction of the spine is taken sideways out from the part carcass.

5. A method according to claim 1, characterized in that the angle relative to the central plane is 15°–30°, preferably 20°–26°, and further preferably approximately 23° at least at the insertion of the knife (21) and when the knife (21) passes a possible sternum (11), and that the angle relative to the second plane is 5°–20°, preferably 7°–17° and further preferably approximately 11° at least at the insertion of the knife.

6. A method according to claim 1, characterized in that the cutting edge (27) is kept substantially at a constant angle relative to the central plane and the second plane.

7. A method according to claim 1, characterized in that the knife (21) is pressed sideways against the ribs (10a, 10b) while moved along them and is rotated into a cutting angle adjusted such that the flank of the knife abuts the ribs (10a, 10b).

8. A method according to claim 1, characterized in that at the beginning the knife (21) is inserted at a predetermined spot relative to the holder (3, 4, 5, 17) and next to the rearmost rib (10a) at a distance therefrom, and is due to the insertion brought into abutment on this rib.

9. A method according to claim 1, characterized in that the knife is rotated about an axis containing the cutting edge (27).

10. An apparatus for use in mechanical releasing of the ribs and the meat positioned therebetween from the adjacent meat of a part carcass of a splitted carcass (2) with a spine (9), characterized in comprising a knife (21) having a substantially rectilinear cutting edge (27) ending in a point (22) and being mounted in a knife holder (23, 24), a device with a holder (3, 4, 5, 17) which can be brought into engagement with the part of the spine (9) of the part carcass carrying the ribs, and means (1, 4, 5) for establishing a relative movement between the part carcass (2) and the knife (21) towards each other in the direction of the spine (9) and further to move the knife away from the spine.

11. An apparatus according to claim 10, characterized in that the knife holder (23,24) is adapted to hold the knife with the cutting edge (27), viewed along the cutting edge in the direction of the point (22), at a predetermined angle which, when the spine of a part carcass is in engagement with the holder, is obliquely inwards and upwards relative to the carcass (2), its central plane and a second plane which is perpendicular to the central plane and parallel with the spine (9).

12. An apparatus according to claim 10, characterized in that the knife holder (23,24) is adapted to displace the knife (21) in a plane substantially perpendicular to the direction of the spine and preferably to rotate the knife about an axis which is parallel with the cutting edge (27).

13. An apparatus according to claim 10, characterized in a detecting device (37) for detecting the passage of the foremost rib (10b) of a part carcass (2) by a relative movement between a secured part carcass (2) and the knife (21) towards one another in the direction of the spine, and guiding means for guiding the displacement of the knife (21) away from the spine and the possible rotation around an axis parallel with the edge, depending on the movement of the knife and the part carcass towards one another in the direction of the spine on basis of the detection.

14. An apparatus according to claim 10, characterized in shackles (39,40) for guiding the breast side of the part carcass (2).

15. An asymmetric knife for use for mechanical cutting free of the ribs and the meat positioned therebetween from the adjacent meat in a part carcass of a splitted carcass with spine, characterized in an elongate rigid blade (15) with a substantially rectilinear cutting edge (27) ending in a point (22), a bias cutoff of the blade (25) extending from the point (22), two substantially parallel side surfaces and a flank (26) angled relative to the adjacent side surface (30), said flank extending from the cutting edge (27) to a line positioned approximately 4–25 mm, preferably approximately 5–20 mm, further preferably approximately 7–15 mm and for instance approximately 10 mm from the cutting edge, the angle ($\alpha$) between the flank (26) and the adjacent side surface (30) being smaller than 180°, preferably smaller than 175° and for instance approximately 170°.

16. A knife according to claim 15, characterized in that the point (22) of the knife is bent out of the plane of the blade (25) opposite the side of the flank (26) and in that preferably a bevelling (28) is provided between the flank (26) and the cutting edge (27).

* * * * *